United States Patent
Teh et al.

(10) Patent No.: US 7,685,346 B2
(45) Date of Patent: Mar. 23, 2010

(54) DEMOTION-BASED ARBITRATION

(75) Inventors: Chee Hak Teh, Penang (MY); Arthur Hunter, Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 11/821,873

(22) Filed: Jun. 26, 2007

(65) Prior Publication Data

US 2009/0006165 A1    Jan. 1, 2009

(51) Int. Cl.
G06F 13/14    (2006.01)

(52) U.S. Cl. .................................................... 710/244

(58) Field of Classification Search ................. 710/244, 710/116, 123
See application file for complete search history.

(56) References Cited

U.S. PATENT DOCUMENTS

| | | | | |
|---|---|---|---|---|
| 3,781,821 | A * | 12/1973 | Roth ........................... | 711/109 |
| 4,161,779 | A * | 7/1979 | Spencer et al. ................. | 710/41 |
| 4,682,282 | A * | 7/1987 | Beasley ....................... | 710/244 |
| 5,151,994 | A * | 9/1992 | Wille et al. .................. | 710/116 |
| 5,241,632 | A * | 8/1993 | O'Connell et al. ........... | 710/117 |
| 5,440,752 | A * | 8/1995 | Lentz et al. .................. | 710/123 |
| 5,778,200 | A * | 7/1998 | Gulick ........................ | 710/113 |
| 5,896,539 | A * | 4/1999 | Arimilli et al. .............. | 710/244 |
| 6,073,132 | A * | 6/2000 | Gehman ........................ | 707/9 |
| 6,574,688 | B1 * | 6/2003 | Dale et al. .................... | 710/52 |
| 6,618,778 | B1 * | 9/2003 | MacCormack .............. | 710/244 |
| 7,080,174 | B1 * | 7/2006 | Thorsbakken et al. ....... | 710/112 |
| 7,350,004 | B2 * | 3/2008 | Fukuyama et al. .......... | 710/241 |
| 7,380,040 | B2 * | 5/2008 | Sarkar et al. ................. | 710/244 |
| 2005/0071210 | A1 | 3/2005 | Gish et al. ...................... | 705/8 |
| 2005/0160188 | A1 | 7/2005 | Bogin et al. ................... | 710/1 |
| 2006/0101179 | A1 * | 5/2006 | Lee et al. ..................... | 710/113 |
| 2008/0288689 | A1 * | 11/2008 | Hoang et al. ................ | 710/113 |

OTHER PUBLICATIONS

U.S. Appl. No. 11/803,287, filed May 14, 2007, entitled "Opportunistic Granting Arbitration Scheme For Fixed Priority Grant Counter Based Arbiter," by Brian Hoang, et al.

* cited by examiner

*Primary Examiner*—Paul R Myers
(74) *Attorney, Agent, or Firm*—Trop, Pruner & Hu, P.C.

(57) ABSTRACT

In one embodiment, the present invention includes a method for arbitrating requests from multiple agents based on an arbitration list to select an agent to receive an arbitration grant, determining whether the selected agent is associated with a grant counter that is at a value of zero, and if so dynamically reordering the arbitration list so that the selected agent is demoted to the lowest portion of the arbitration list. Other embodiments are described and claimed.

5 Claims, 4 Drawing Sheets

DEMOTION-BASED ARBITRATION

BACKGROUND

In traditional grant counter-based arbitration schemes, each agent utilizes grant counters to limit the number of commands it can send before another agent will be allowed to send commands during a fixed arbitration session, which is the arbitration performed between grant count resets. When an agent's grant counter has expired, its request is masked. These masked requests will then be arbitrated on a fixed priority. The agents will only be able to assert a pipelined request for one clock when trying to do back-to-back cycles. This causes an unfair arbitration of the least prioritized agent in an arbitration session. If the least prioritized agent does not assert its pipelined request for the remaining number of grant counts, the grant counters will be reset before all the grant counts for the least prioritized agent expire. Thus, the least prioritized agent will only get granted the number of times the pipelined request is asserted back-to-back. This arbitration scheme penalizes the lowest priority agent that is unable to assert its pipelined request properly.

DETAILED DESCRIPTION

In various embodiments, a demotion-based priority grant count arbitration scheme may be provided to enable a fair arbitration policy to all agents seeking access to arbitrated resources. Furthermore, embodiments may provide for programmable dynamic bandwidth allocation by use of grant counters or other such counter-based methods. Furthermore, embodiments may operate without fixed arbitration windows or sessions such that there is no need to reload all grant counters at the conclusion of such a window, as no such arbitration window is present.

Figure 1:
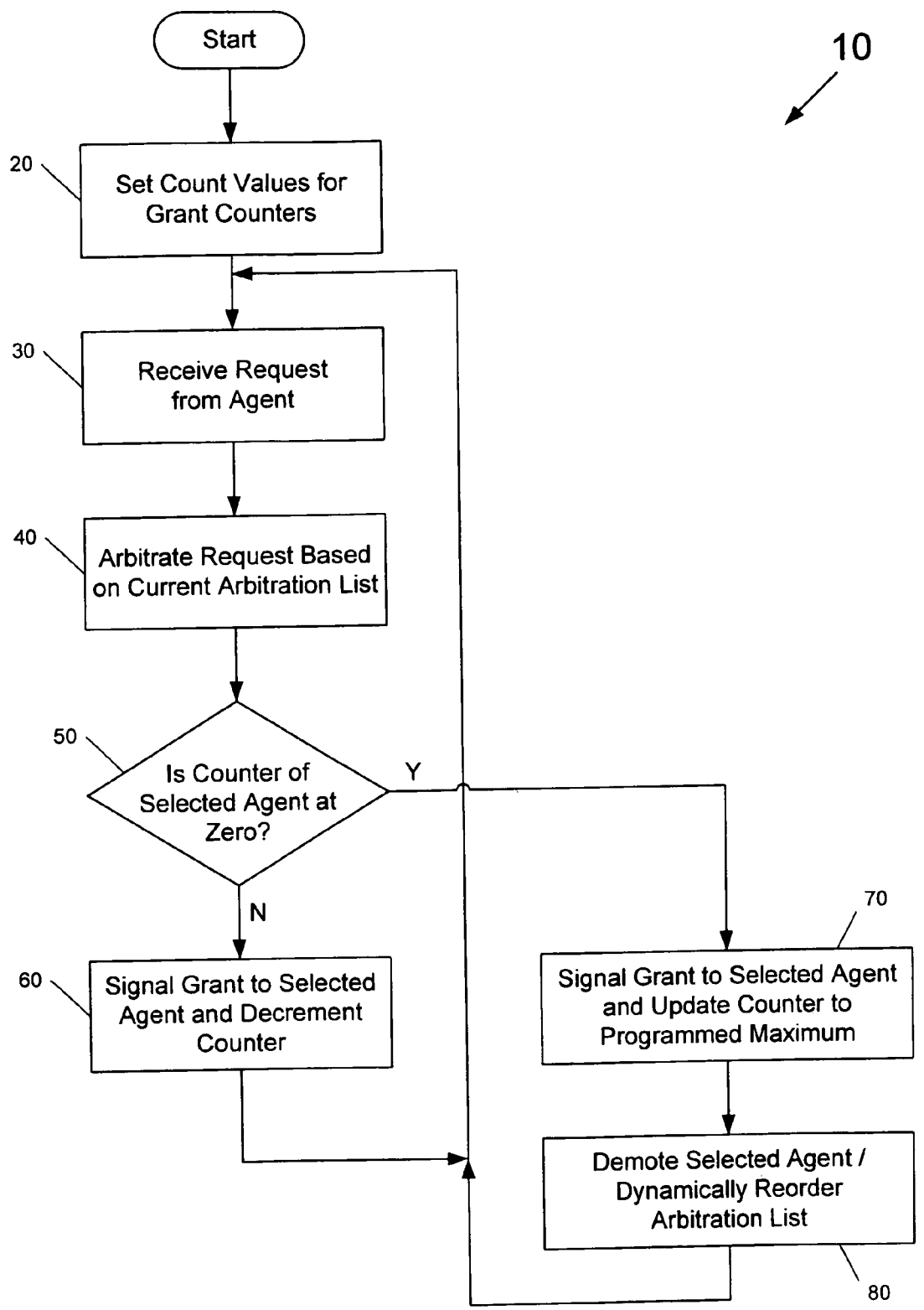
FIG. 1 is a flow diagram of a method in accordance with an embodiment of the present invention.

Referring now to FIG. 1, shown is a flow diagram of a method in accordance with an embodiment of the present invention. As shown in FIG. 1, method 10 may be used to perform arbitration in accordance with an embodiment of the present invention. As shown in FIG. 1, method 10 may begin by setting count values for grant counters (block 20). For example, preprogrammed grant counts may be provided for each of multiple agents. The grant counters may be used to track bandwidth consumption of each agent being arbitrated. In one embodiment, the grant counters may be three-bit decrementing counters to enable support of up to a maximum grant ratio of 8:1 amongst agents. In some embodiments, the counters may be initially programmed to the grant count intended for the agent, with the counter associated with the highest priority agent having a greatest grant count.

Referring still to FIG. 1, during operation a request may be received from an agent (block 30). While shown as one request, of course multiple requests may be made by multiple agents. Then an arbiter in accordance with an embodiment of the present invention may arbitrate the request(s) based on a current arbitration list (block 40). Note that in various embodiments, this arbitration list may be a demotion-based priority list, as will be described further below. Then it may be determined whether the agent selected for grant has a counter that is at a value of zero (diamond 50). If not, the counter may be decremented and a grant signal sent to the selected agent (block 60). Then control may pass back to block 30 for receipt of other requests.

If instead at diamond 50 it is determined that the selected counter is at a value of zero, the counter may be updated to its programmed maximum and the grant signal is sent to the selected agent (block 70). Note that this updating of the grant counter occurs immediately, rather than waiting for conclusion of a fixed arbitration window. Furthermore, when a counter associated with an agent is reloaded with its maximum value, a dynamic reordering of the arbitration list occurs such that the selected agent is demoted, e.g., to the lowest portion of the arbitration list (block 80). Control then passes back to block 30 discussed above. While shown with this particular implementation in the embodiment of FIG. 1, the scope of the present invention is not limited in this regard.

Figure 2:
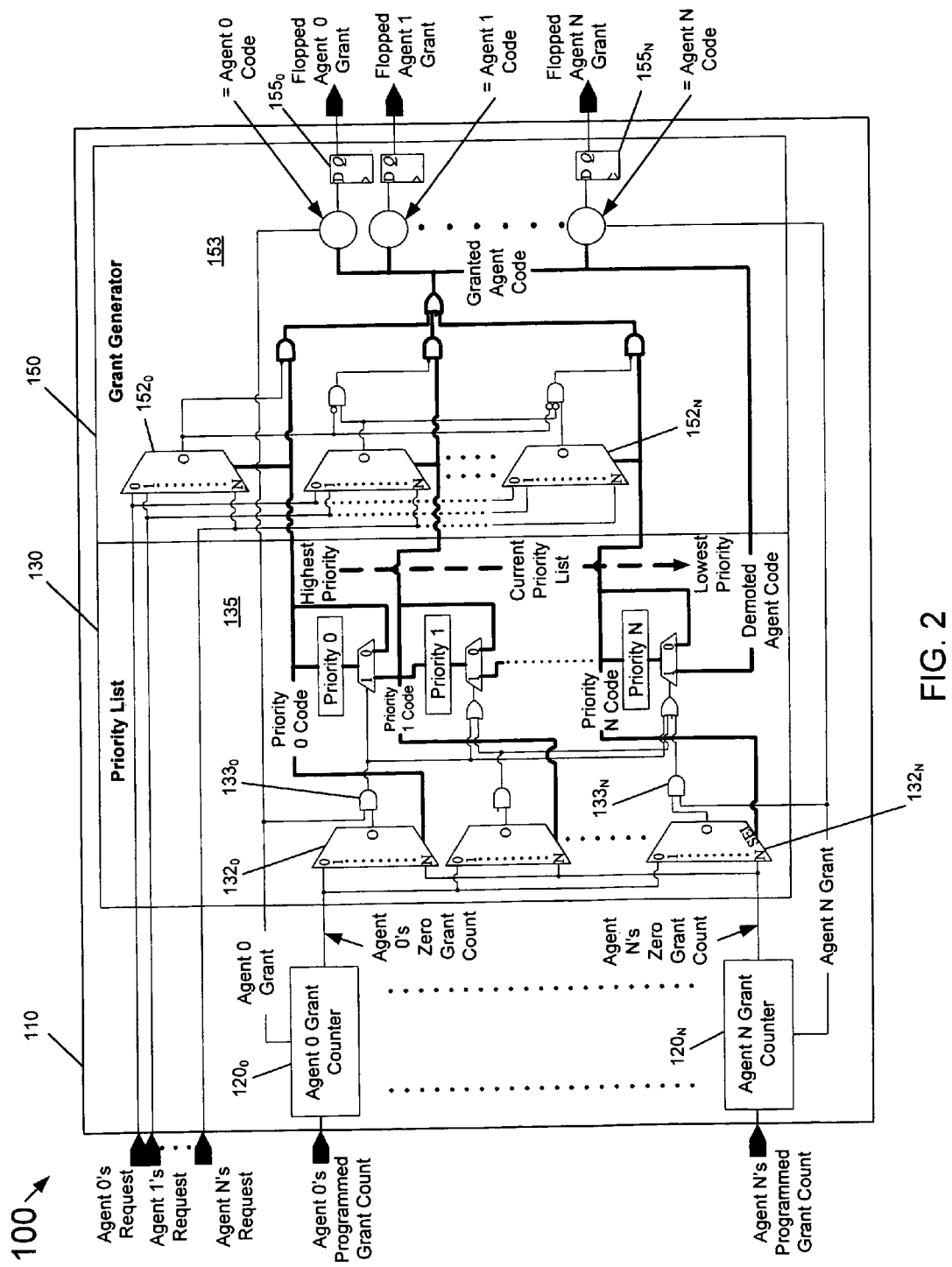
FIG. 2 is a block diagram of a portion of a system in accordance with an embodiment of the present invention.

Referring now to FIG. 2, shown is a block diagram of a portion of a system in accordance with an embodiment of the present invention. As shown in FIG. 2, system 100 may include an arbiter 110. In different embodiments, arbiter 110 may be included in different portions of a system, for example in a chipset component such as a memory controller hub (MCH) or an input/output hub (IOH) or another such location. For example, other embodiments may be incorporated in a processor such as a central processing unit (CPU) or other such location.

As shown in FIG. 2, arbiter 110 includes a plurality of grant counters $120_0$-$12_N$ (generically grant counter 120), each of which is adapted to store a current grant count for an associated agent. As shown in FIG. 2, each grant counter 120 is coupled to receive a programmed grant count for its associated agent, which may be received from various locations. The expiration of the grant counts from grant counters 120 may be provided to a priority list 130 such that a granted agent that has an expired grant count will re-order priority list 130 to demote the granted agent's priority. As shown in FIG. 2, priority list 130 may be configured as a selective shift register to provide a demotion-based arbitration list. That is, priority list 130 may be dynamically updated to provide an active priority list. Initially, each agent may be given a slot/code in the shift register, i.e., an initial priority order. The agent at the end (i.e., outlet) of the selective shift register will have the highest priority in the current arbitration list, while the agent at the front (i.e., inlet) of the selective shift register has the lowest priority in the current arbitration list. Note that in one embodiment an agent code of all zeros may be reserved and not assigned to any agent.

As shown in FIG. 2, priority list 130 may include a plurality of front end multiplexers $132_0$-$132_N$ (generically front end multiplexer 132) each to receive the grant count expiration from grant counters 120. Front end multiplexer 132 is controlled by a priority code for a selected agent which thus provides an output from front end multiplexer 132 to a corresponding logic gate $133_0$-$133_N$ (generically logic gate 133) to qualify the expiration of the grant counter with the agent being granted. The resulting output is coupled to different stages of a selective shift register 135. As shown, the outlet portion of selective shift register 135 (i.e., priority zero) has the highest priority, while the inlet portion (i.e., priority N) has the lowest priority.

Encoding of each agent in each entry of the priority list is used as a multiplexer select to multiplex out the corresponding agent's request to be arbitrated. Thus, the first priority slot of shift register 135 with its request asserted will be granted and the encoding that corresponds to the slot being granted is passed over to a grant generator 150. Once any agent in selective shift register 135 expires its grant count (i.e., the agent's grant counter 120 is at a value of zero when its request is granted) that agent will be demoted and all agents that are of lower priority compared to the demoted agent will be promoted (i.e., shifted up). This may be achieved by controlling the shift enable of shift register 135 at each slot. In one embodiment, the shift enable for a particular slot in shift register 135 may be asserted when: the encoding of the slot matches the demoted agent's encoding (i.e., Demoted Agent Code equals Priority Code entry N); or the shift enable for a higher priority agent in the priority list is asserted.

In turn, grant generator 150 may select a request for granting. As shown in FIG. 2, grant generator 150 includes a set of multiplexers $152_0$-$152_N$ (generically multiplexer 152) controlled by the priority code output from priority list 130. The outputs of multiplexers 152, i.e., which correspond to an agent having the highest priority and an active request, is provided through a logic complex 153, which selects the highest priority agent having an active request signal for granting of access to the associated resource, which may be a memory resource, a computation resource such as a processing unit (or a portion thereof) or other such resource.

Note that grant generator 150 upon selection of a given agent provides a Granted Agent Code as a feedback signal back to priority list 130. Such signal may be used to provide for demotion of a given agent when that agent has its grant counter at a value of zero and has been granted access. Note further that an Agent Grant Signal is provided from grant generator 150 back to the corresponding grant counter 120 to decrement the count each time a grant is provided. Of course, the Agent Grant Signal may also be provided (e.g., through a selected one of flip-flops $155_a$-$155_n$) to the corresponding agent to indicate that its request has been granted. While shown with this particular implementation in the embodiment of FIG. 2, the scope of the present invention is not limited in this regard.

Figure 3:
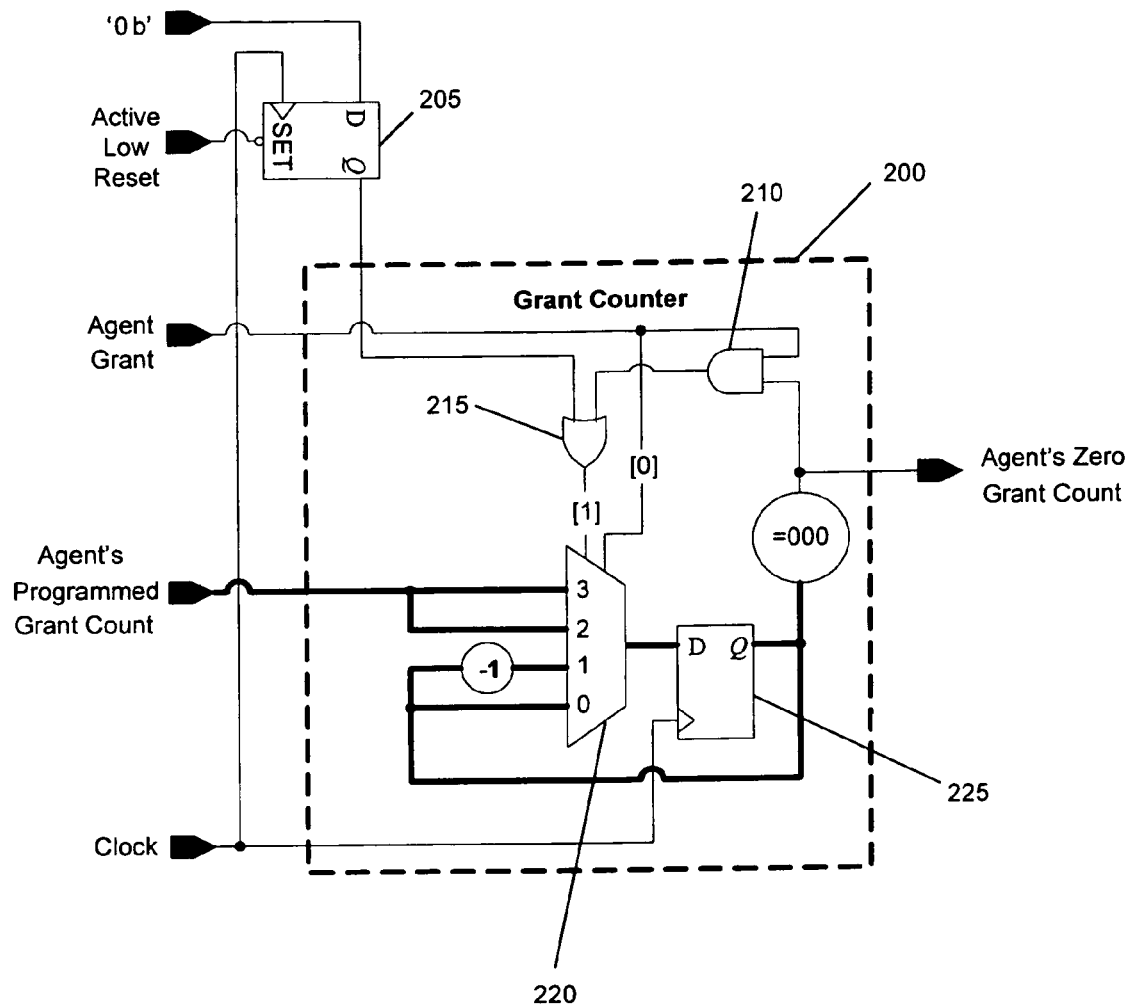
FIG. 3 is a block diagram of a grant counter in accordance with an embodiment of the present invention.

Referring now to FIG. 3, shown is a block diagram of a grant counter in accordance with an embodiment of the present invention. As shown in FIG. 3, grant counter 200 is coupled to receive an agent grant signal at a first logic gate 210. Furthermore, grant counter 200 includes a multiplexer 220 that receives the agent's programmed grant count and several predetermined values. Multiplexer 220 is controlled by the agent grant signal as well as an output of a second logic gate 215 that is further coupled to receive a fixed value from a flip-flop 205. In turn, the selected value of multiplexer 220, e.g., corresponding to the current count is provided through a flip-flop 225 and out of grant counter 200 as the current value for the given agent. While shown with this particular implementation in the embodiment of FIG. 3, the scope of the present invention is not limited in this regard.

Figure 4:
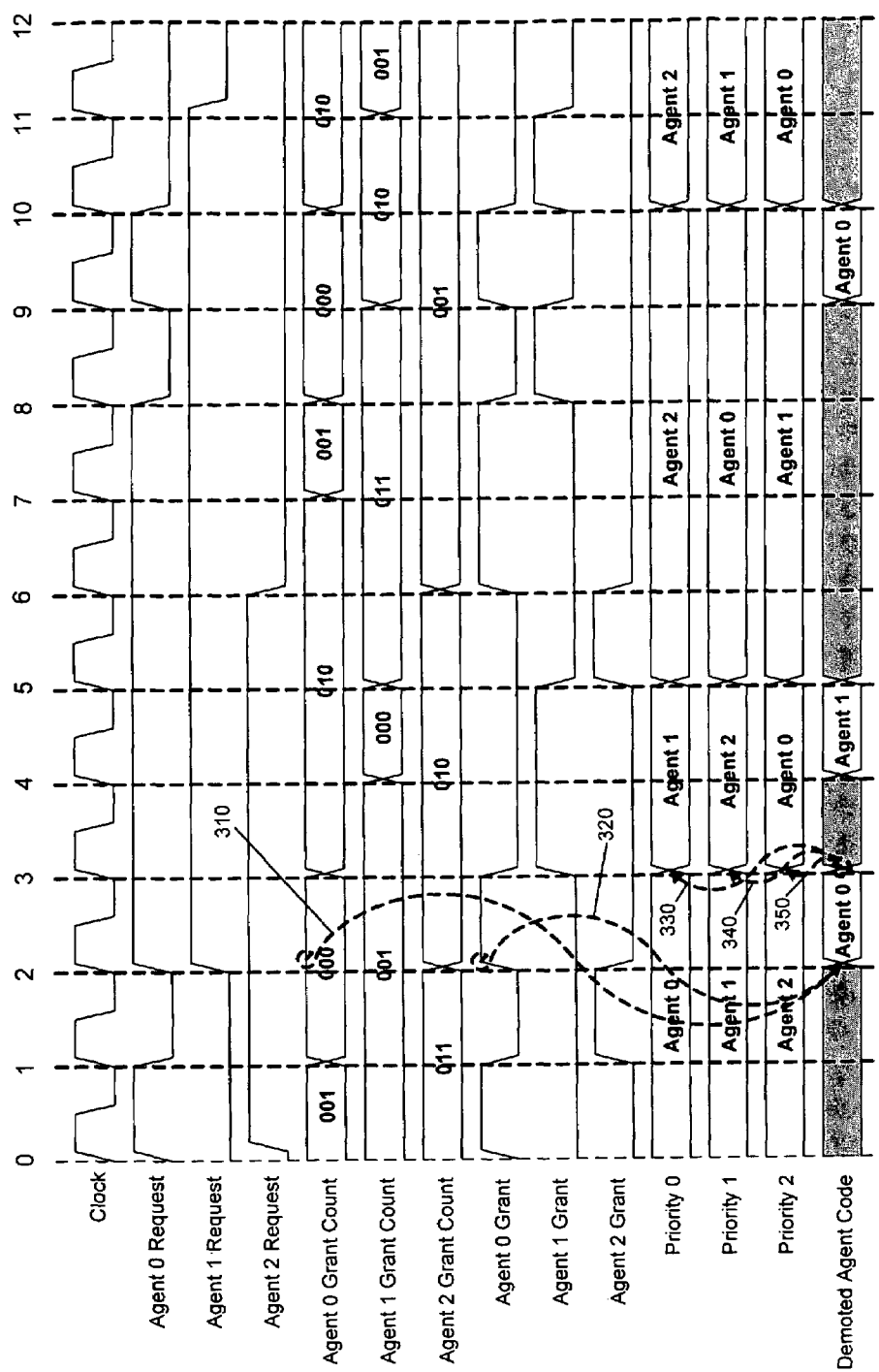
FIG. 4 is a timing diagram of operations in accordance with one embodiment of the present invention.

Referring now to FIG. 4, shown is a timing diagram of operation in accordance with one embodiment of the present invention. More particularly, FIG. 4 illustrates the demotion-based operation of embodiments. Specifically, responsive to various agent requests and agent grant counts, a dynamic priority is established and provided to a grant generator to enable generation of an Agent Grant signal. Furthermore, note that when a given agent has its grant count at a value of zero and another grant is provided for that agent, a preprogrammed grant count for that agent may be reset and a demotion of that agent occurs. Thus as shown via arrows 310 and 320 at time T=2, agent zero is granted access and is then demoted and priority changes, as represented with arrows 330, 340 and 350. Similarly, at time T=4, agent one which has its grant count at a value of zero and has a valid grant signal generated, is demoted. A similar demotion occurs with respect to agent zero at time T=9. In this way, a truly fair arbitration policy is provided for all agents, allowing for programmable dynamic bandwidth allocation. While shown with this particular implementation in the embodiment of FIG. 4, the scope of the present invention is not limited.

Embodiments of the present invention may be implemented in various systems such as a system in accordance with a Peripheral Component Interconnect (PCI) Express™ (PCIe™) architecture based on the PCI Express™ Specification Base Specification version 1.1 (published Mar. 28, 2005), or other such protocol. Such a system may include a root complex that connects a processor and memory subsystem to the system's input/output (I/O) devices. Such a root complex may include an arbiter in accordance with one embodiment of the present invention.

Thus in various embodiments, actual programmable bandwidth allocation may be provided. That is, by eliminating a fixed arbitration window, whenever an agent expires its window of allocated grant counts, that agent will give way to other agents with pending grant counts yet to be exhausted, ensuring fairness to all agents by at least guaranteeing the bandwidth programmed for it by the grant counters. Once an agent exhausts its allocated bandwidth, it may give priority to the next prioritized agent, meaning that even if an agent is programmed with a low grant count (i.e., a low bandwidth agent) it will be at least of a higher priority when it has a cycle for arbitration, thus guaranteeing the bandwidth for which it was programmed. Furthermore, embodiments, by use of a selective shift register to reorder arbitration priority on grant counter expiration, eliminate a fixed arbitration window. In this way, every agent is ensured at least its fair share of programmed bandwidth. Furthermore, embodiments, may remove complexity and boundary scenarios in grant counter reload logic.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a plurality of grant counters each associated with an agent of a system that is to request access to a resource, wherein each of the plurality of grant counters is to be decremented when the corresponding agent is granted access, and wherein a value of the grant counter is to be updated to a predetermined maximum count for the corresponding agent upon an access grant to the corresponding agent when the value is zero;

a demotion-based priority list coupled to the plurality of grant counters to maintain an active arbitration priority list, the priority list including a shift register; and a grant generator coupled to the priority list to perform arbitration based on status of the priority list and to generate a grant signal;

wherein (a) the corresponding grant counter is to be reset to the predetermined maximum count after the grant signal is provided for the agent, and without expiration of a fixed arbitration window; (b) the priority list is to demote an agent, when the value of the corresponding grant counter is at zero and a grant signal is provided for the agent, promote other agents in the priority list when the agent is demoted, and include a first plurality of multiplexors, each to receive a grant count expiration from the plurality of grant counters, and (c) a first of the multiplexors and a first of the grant counters are both associated with a first agent of the system.

2. The apparatus of claim 1, wherein the grant generator is to send a grant signal to a first agent and to the grant counter corresponding to the first agent, wherein the grant counter is to decrement the count based on the grant signal.

3. The apparatus of claim 1, wherein the shift register comprises a selective shift register to dynamically reorder arbitration priority between the agents when a corresponding value of one of the grant counters expires and the corresponding agent is granted access.

4. The apparatus of claim 1, wherein the grant generator includes a second plurality of multiplexors each controlled by a respective priority code output from the priority list and further wherein one of the second plurality of multiplexors and one of the grant counters are both associated with one agent of the system.

5. The apparatus of claim 4, wherein each of the grant counters includes a multiplexor that multiplexes based [1] on a grant signal from the grant generator, [2] an agent's preprogrammed grant count, and [3] a reset signal.

* * * * *